Patented Sept. 20, 1938

2,130,413

UNITED STATES PATENT OFFICE 2,130,413

REINFORCED RUBBER ARTICLE

John L. Bitter, Johnson City, Tenn., assignor to North American Rayon Corporation, New York, N. Y., a corporation of Delaware No Drawing. Original application August 6, 1934, Serial No. 738,690. Patent No. 2,080,002, dated May 11, 1937. Divided and this application April 6, 1937, Serial No. 135,241

4 Claims. (Cl. 91—68)

This is a divisional application of Serial Number 738,690, filed August 6, 1934, issued as Patent 2,080,002 on May 11, 1937.

My present invention concerns a new method for preparing threads of artificial origin which may be employed in the manufacture of automobile tires and the like.

One object of the present invention is to prepare a synthetic thread which can be employed to replace the cotton and other threads now in use in the automobile industry, and which will possess characteristics peculiarly adapting it for such use.

There is between cellulose and rubber somewhat of a natural incompatibility. The hydroxyl groups of the cellulose and the hydro-carbon structure peculiar to rubber act to repel one another rather than to unite. It has been found, however, that carbon in the form of carbon black possesses a natural affinity for rubber. In accordance with my present invention, therefore, I prepare a cellulosic solution and incorporate with it a quantity of carbon black. Unlike pigments, carbon does not lie inertly in the solution and in the final filaments, but because of its surface activity attracts, to some extent, the cellulose of the solution.

I am well aware that the incorporation of carbon black in a solution, for the purpose of giving it a dull or opaque appearance, has been suggested. In that case, however, the carbon black was erroneously included in a group of so-called "inorganic pigment-like particles." It is for its non-pigment-like properties that I am at present making use of this element. It will be especially noted that the high percentages of carbon black employed by me would act to produce an objectionably colored filament when the ordinary use of such yarns is considered.

The exact chemical and physical action of carbon with respect to rubber is not definitely known but several theories have been advanced concerning this point. It is probably best explained by the great surface activity of the carbon black particles in co-action with a pronounced affinity of carbon for the hydro-carbon characteristics of the rubber. I have found that when artificial filaments are prepared in accordance with my present invention, the carbon embedded in the filaments possesses a peculiar affinity for the rubber to be employed and thus a closer union of the synthetic thread and the rubber is possible.

As one way in which my invention may be carried out, the following example is given:

I. A viscose solution containing approximately 7% of cellulose is made up in the ordinary manner and from 10 to 20% of carbon black is dumped into the mixer containing the viscose. The percentage is calculated upon the weight of cellulose present in the solution. This solution is then filtered and spun through ordinary spinnerettes. The filaments contain, and have widely dispersed throughout their mass, quantities of the carbon in finely divided form.

II. As an alternative method, I have found that carbon black may be wetted with sodium hydroxide and may be mixed, or suspended, in a portion of the hydroxide prior to mixing the same with the viscose.

III. In the manufacture of cuprammonium filaments, cellulose is placed in solution in copper-oxide-ammonia, and then this solution is spun in the manner described in Example I above. Similarly, carbon may be included in the form of carbon black in nitrocellulosic solutions and in solutions of cellulose esters and ethers.

My new inventive concept may be also employed with respect to the cotton or other threads now being used in the automobile industry. Cotton may be coated with a viscose solution prepared, for instance, as set forth in Example I, and this coated thread may be employed in the manufacture of the tire. The manner in which this may be carried out is clearly set forth in the following example:

IV. A viscose solution is prepared, as set forth in Example I, but instead of extruding the solution, a cotton thread is passed therethrough. The carbon impregnated viscose solution forms a coating on the cotton and this coating is then fixed or precipitated by passing the thread directly into a bath. The threads thus coated may be desulphurized and dried or otherwise after-treated in the known manner.

It has been found that cotton so treated is more compatible with rubber and thus a natural incompatibility between cellulose and rubber is overcome and a closer union between the treated cotton and the rubber in the finished product will result.

While I have mentioned the use of from 10–20% of carbon black, it is to be understood that this proportion gives the best results without unduly weakening filaments to be spun from the solution. If too much carbon is employed the resulting filaments and the threads made therefrom will be lacking pliability and tensile strength. Smaller percentages of carbon, of course, may be employed, but sufficient should be included to secure a good union and co-action between the synthetic material and the rubber.

The carbon content of the cellulose solution to be employed when cotton or other natural fiber threads are coated as set forth in Example IV above, may be varied within greater limits than those just described. This is evident from the fact that the tensile strength of the viscose coating is not in question and so amounts ranging as high as 50% of carbon black, calculated on the weight of the viscose present, may be employed. The amount of carbon to be used, of course, depends upon the needs arising in each specific case.

Although Example IV alone is given with respect to viscose, it may be easily perceived that this process could also be followed with respect to cuprammonium cellulose, cellulose nitrate, and organic derivatives of cellulose as well. In the cuprammonium art, for instance, the solution prepared as in Example III above, may be employed and after passing the cotton therethrough, the coating could be solidified by using acids or alkalies in the known manner and then the coated filaments could be treated for copper removal, etc.

Having now set forth my invention as required by the patent statutes, what I claim is:

1. A rubber article having embedded therein strengthening cotton threads, said threads having a coating of a cellulosic substance selected from the group consisting of regenerated celluloses, cellulose esters and cellulose ethers containing about 10 to 50% of a finely divided carbon black.

2. A rubber article having embedded therein strengthening threads of cotton, said threads having a coating of a regenerated cellulose containing about 10 to 50% of a carbon black.

3. A rubber article having embedded therein strengthening cotton threads, said threads having a coating of a cellulose ester containing about 10 to 50% of a finely divided carbon black.

4. A rubber article having embedded therein strengthening cotton threads, said threads having a coating of a cellulose ether containing about 10 to 50% of a finely divided carbon black.

JOHN L. BITTER.